United States Patent [19]
Turner

[11] 3,863,254

[45] Jan. 28, 1975

[54] SYSTEM FOR THE DELAYED DISPERSAL OF CHAFF IN OUTER SPACE

[75] Inventor: James W. Turner, Bay Village, Ohio

[73] Assignee: The United States of America as represented by the Secretary of the Air Force, Washington, D.C.

[22] Filed: Mar. 11, 1969

[21] Appl. No.: 808,037

[52] U.S. Cl. .............................. 343/18 B, 102/34.4
[51] Int. Cl. ........................... G01s 7/42, H04k 3/00
[58] Field of Search .................. 343/18 B; 102/34.4

[56] References Cited
UNITED STATES PATENTS

| | | | |
|---|---|---|---|
| 2,519,825 | 8/1950 | DeMent | 343/18 B |
| 2,871,344 | 1/1959 | Busignies | 343/18 B |
| 3,222,675 | 12/1965 | Schwartz | 343/18 B |

*Primary Examiner*—Malcolm F. Hubler
*Attorney, Agent, or Firm*—Harry A. Herbert, Jr.; William J. O'Brien

[57] ABSTRACT

A system for the delayed dispersal of dipole conductors or radar reflecting chaff into the upper atmosphere. Dispersion is effected by potting the chaff material in a volatile binder material that will evaporate when subjected to the thermal shock conditions occurring during the re-entry regime of a rocket vehicle.

3 Claims, 6 Drawing Figures

PATENTED JAN 28 1975   3,863,254

INVENTOR.
JAMES W. TURNER
BY Harry A. Herbert Jr.
and William J. O'Brien
ATTORNEYS

SYSTEM FOR THE DELAYED DISPERSAL OF CHAFF IN OUTER SPACE

BACKGROUND OF THE INVENTION

This invention relates to a system for dispersing chaff material in outer space. More particularly, this invention concerns itself with a system of potting chaff material in a volatile binder for ejection and delayed dispersal of the chaff material into outer space during the re-entry regime of a chaff-carrying missile.

The utilization of dipole conductors or radar reflecting chaff materials such as aluminum foil and metallized glass fibers for the purpose of confusing radar detecting devices is well known. A number of methods together with a variety of radar reflecting materials have been suggested. Generally, the chaff material is dropped from a suitable aircraft at predetermined intervals and and heights sufficient to distract or confuse radar observers. Obviously, the resultant confusion of the enemies detection devices provides a distinct tactical advantage to attacking aircraft. With the advent of high altitude aircraft and rocket vehicles, the utilization of conventional aircraft as a dispersing means was obviously not feasible. The suggestion that rocket vehicles be employed to disperse such materials has likewise proved problematical. The tremendous thermal shock encountered by rocket vehicles during re-entry tended to vaporize any chaff material that had been ejected during a re-entry regime. Also, attempts to eject a multiplicity of chaff-containing packages in normal space often required an hour or more to fully effect dispersion of the chaff. Because of the length of time involved, the chaff material was unfavorably dispersed over wide areas without achieving the type of concentrated dispersion needed to simulate attacking rockets.

In further attempts to overcome the problems set forth above, it has been found that radar reflecting chaff material can be effectively dispersed from a rocket vehicle during its re-entry regime if the chaff material is first potted in a solid or liquid binder material that becomes highly volatile when subjected to the thermal shock conditions encountered during the re-entry regime of a rocket vehicle. The system of this invention permits the ejection of a multiplicity of chaff containing packages from a re-entering rocket vehicle and the subsequent dispersion of the chaff material in a relatively short period of time. The heat-triggered release results in the dispersal of a large number of bundles of chaff, each of which gives rise to a radar image of a large falling object.

SUMMARY OF THE INVENTION

In accordance with the present invention, it has been found that the potting of radar reflecting materials within a liquid or solid highly volatile binder material permits the effective ejection and dispersal of chaff materials from a rocket vehicle during its re-entry regime. Suitable binder materials are those which are characterized by a high degree of volatility when subjected to the high vacuum and elevated temperature conditions occurring during the re-entry regime of missiles and rocket vehicles.

Accordingly, the primary object of this invention is to provide a system for confusing and distracting radar observers by dispersing radar reflecting materials in the upper atmosphere.

Another object of this invention is to provide a system for the ejection and dispersal of radar reflecting materials during the re-entry regime of a rocket vehicle.

Still another object of this invention is to provide a system for ejecting a multiplicity of chaff-containing packages at predetermined intervals whereby the ultimate and simultaneous dispersion of the chaff material effects a simulation of a number of attacking aircraft.

A further object of this invention is to provide a system for dispersing chaff material without encountering thermal destruction thereof during the re-entry of a rocket vehicle.

The above and still further objects and advantages of the present invention will become even more apparent when considered in light of the following detailed description thereof and the accompanying drawing:

BRIEF DESCRIPTION OF THE DRAWING

In the drawing.

In each of the views similar parts bear like reference characters.

DESCRIPTION OF THE PREFERRED EMBODIMENT

Pursuant to the above objects of this invention, the present system involves the potting of radar reflecting material or dipoles in a volatile binder for ejection and dispersal of the reflecting dipoles into the upper atmosphere during the re-entry of a rocket vehicle. Upon encountering the thermal shock conditions of re-entry, the volatile binder evaporates and releases the potted dipoles for dispersion.

One way of doing this is to impregnate a bundle of metallized glass fibers with a suitable solvent, either in pressure or in vacuum. Another way is to immerse them in a molten, volatile solid so that this will bind the fibers on cooling.

Still another method is to hold the chaff materials in a sheet material, such as paper material, which is impregnated with a volatile solid so as to bind the bundle together. A still further method is to impregnate a bundle of the chaff with a foaming volatile solid, so that the foam material will immerse it and cause binding at a minimum of weight.

A still further way of doing it is to intermix the chaff particles with a powdered volatile binding material and then apply barely enough heat to melt this material, but not enough to make it evaporate immediately. In this fashion, too, the chaff material will become consolidated into bundles which will be released when the binding material evaporates.

As suitable binding materials for this purpose may be mentioned paradichlorobenzene, ammonium chloride, succinimide, phthalimide, phthalic anhydride, and generally substances which readily change from a liquid or solid to the gaseous state.

Figure 1:
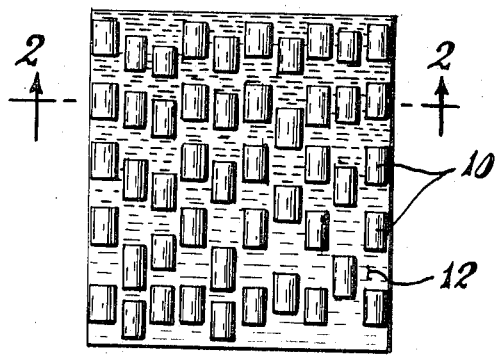
FIG. 1 illustrates an embodiment of a cylindrical mass of radar reflecting dipoles potted within a liquid binder material.
Figure 2:
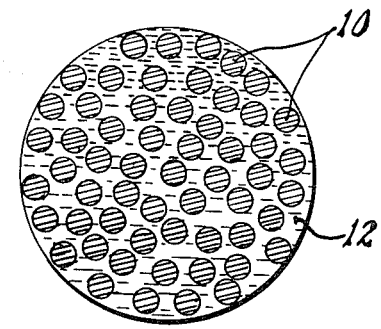
FIG. 2 is a sectional view of the cylindrical mass of FIG. 1 taken along the line 2—2.
Figure 3:
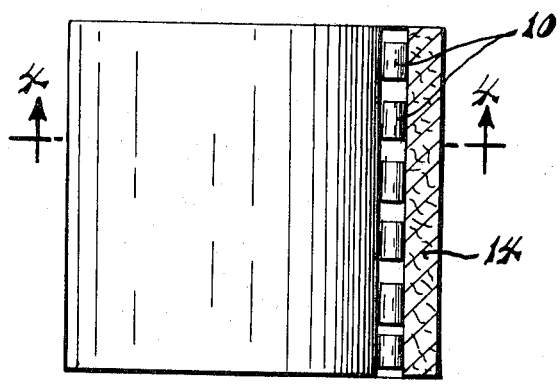
FIG. 3 illustrates another embodiment of a cylindrical mass of radar reflecting dipoles held together by a sheet material impregnatd with a volatile binder material.
Figure 4:
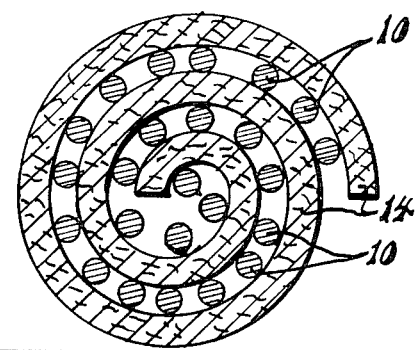
FIG. 4 is a sectional view of the cylindrical mass of FIG. 3 taken along line 4—4.
Figure 5:
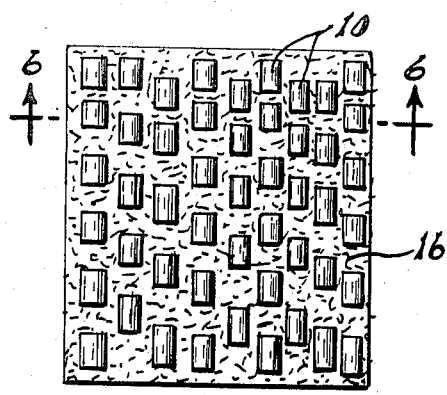
FIG. 5 illustrates still another embodiment of this invention utilizing a solid binder material.
Figure 6:
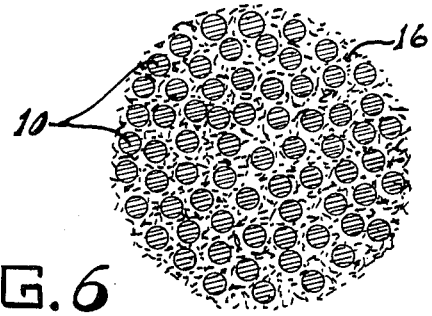
FIG. 6 is a sectional view of the embodiment of FIG. 5 taken along line 6—6.

Referring to the drawings, there is shown in FIGS. 1 and 2, in exaggerated form, a plurality of radar reflecting objects or dipole conductors 10 held together by a volatile liquid binder 12 which solidifies and binds the dipoles upon cooling. FIGS. 3 and 4 illustrate a further embodiment in which the dipoles 10 are held together by a sheet of paper 14 which has previously been impregnated with a volatile binder. FIGS. 5 and 6 illustrate still another embodiment of the invention in which the dipole elements 10 are held together by a volatile powdered binder material 16. The powdered binder is heated slightly to melt and encase the dipoles 10 but it is not heated enough to make it evaporate.

When the bundles of dipole elements illustrated in the drawings are ejected into space, the evaporation of the binder material will be greatly speeded up because of the hard vacuum. The release of the dipoles will take place in a time which can be varied from a few seconds to a few hours, depending on the volatile binder substance selected. For example, paradichlorobenzene will evaporate in about 2 hours so as to free a bundle substantially completely.

This invention is of particular interest when it comes to releasing a multiplicity of simulated attacking bodies upon re-entry. Packages of chaff material potted in the manner described herein, which in normal space would require perhaps an hour to fully disperse, will disperse in a few seconds under the conditions of re-entry because of the temperature shock there encountered. At the same time, the evaporation of the binder material will sufficiently cool the fibers to protect them from thermal destruction. In this fashion a number of bundles such as those shown in the drawing can be released from a rocket as the re-entry begins; such heat-triggered release will result in the dispersal of a large number of bundles, each of which will then give rise to a radar picture of a large falling object.

A convenient method for dispersing the chaff-containing packages of this invention is to place the package within the nosecone of a rocket vehicle. Upon re-entering the earth's atmosphere, the chaff-containing package is ejected from the nosecone by any conventional ejection means or method. Upon encountering the high vacuum and elevated temperature conditions of re-entry, the binder evaporates thereby permitting the dispersion of the chaff material.

The invention has been described with particular reference to specific embodiments thereof. However, it is to be understood that the description of the invention is for the purpose of illustration only and it is not intended to limit the invention in any way.

What is claimed is:

1. A method for dispersing radar reflecting material into the upper atmosphere to simulate attacking bodies which comprise ejecting from a rocket vehicle during its re-entry regime, a package of dipole conductors bound together by a highly volatile binder material wherein said binder material is selected from the group consisting of paradichlorobenzene, ammonium chloride, succinimide, phthalimide, and phthalic anhydride, and subjecting said package to the thermal shock conditions occurring during the re-entry regime whereby said binder evaporates and permits the dispersion of said dipole conductors into the atmosphere.

2. A method in accordance with claim 1 wherein a plurality of individual packages are ejected from said rocket vehicle and each of said plurality of packages is bound together by the same volatile binder material.

3. A method in accordance with claim 2 wherein each of said plurality of packages is bound together by a different volatile binder material.

* * * * *